United States Patent [19]

Luly

[11] Patent Number: 4,527,166

[45] Date of Patent: Jul. 2, 1985

[54] LIGHTWEIGHT FOLDING PARABOLIC REFLECTOR AND ANTENNA SYSTEM

[76] Inventor: Robert A. Luly, 449 S. Sierra Way, San Bernardino, Calif. 92406

[21] Appl. No.: 279,734

[22] Filed: Jul. 2, 1981

Related U.S. Application Data

[63] Continuation-in-part of Ser. No. 247,922, Mar. 26, 1981, abandoned.

[51] Int. Cl.³ .............................................. H01Q 15/20
[52] U.S. Cl. ...................................... 343/840; 343/915
[58] Field of Search ...................... 343/840, 880, 915; 126/438, 439

[56] References Cited

U.S. PATENT DOCUMENTS

| | | | |
|---|---|---|---|
| 2,072,262 | 3/1937 | Herzog et al. | 343/817 |
| 2,539,511 | 1/1951 | Hansen et al. | 343/781 P |
| 2,674,693 | 4/1954 | Millett et al. | 343/915 |
| 2,829,366 | 4/1958 | Armstrong et al. | 343/781 P |
| 2,945,234 | 7/1960 | Driscoll | 343/915 |
| 3,286,270 | 11/1966 | Kelly | 343/915 |
| 3,635,547 | 1/1972 | Rushing et al. | 343/915 |
| 4,249,184 | 2/1981 | Vines | 343/915 |

Primary Examiner—Eli Lieberman
Attorney, Agent, or Firm—Beehler, Pavitt, Siegemund, Jagger & Martella

[57] ABSTRACT

A portable lightweight folding parabolic reflector antenna for reception of microwave signals includes an axial waveguide tube which constitutes the main structural supporting member of the antenna, a ten- to fifteen-foot diameter dish mounted to the waveguide and a sub-reflector supported at the forward end of the waveguide. A low noise amplifier may be mounted to the rear end of the waveguide for amplification of the received signals. The folding dish includes a single sheet of resiliently elastic reflecting mesh supported by a radial framework of normally straight resiliently flexible spokes of tapering cross section. The spokes are pivotable by a lever system between a folded axial position and a deployed radial position. The normally straight spokes are stressed upon deployment by a perimeter cable to the desired parabolic or spherical curvature and the elastic mesh is stretched over the convex side of the radial framework by the perimeter cable, so that the mesh assumes the curvature of the radial spokes to present a dished parabolic reflecting surface towards the subreflector.

38 Claims, 8 Drawing Figures

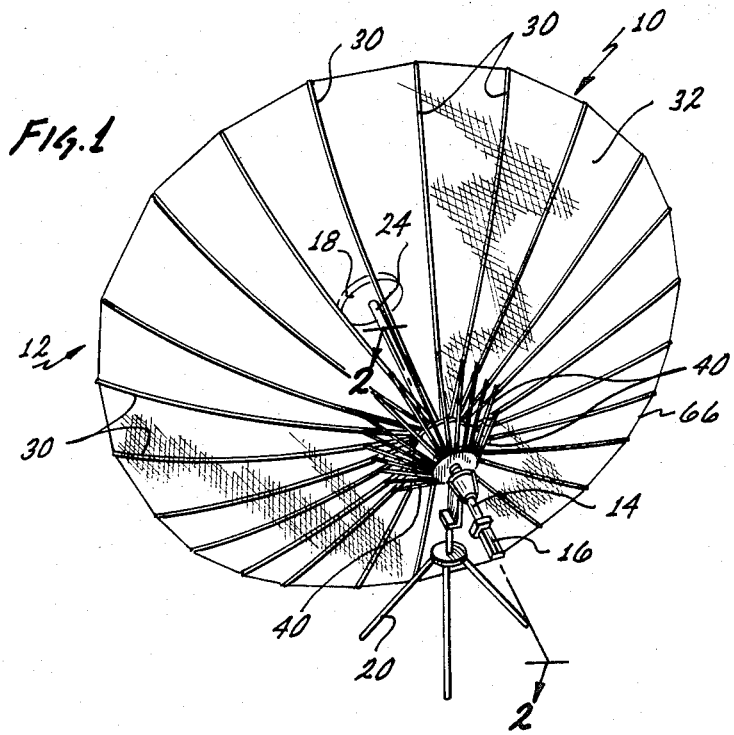
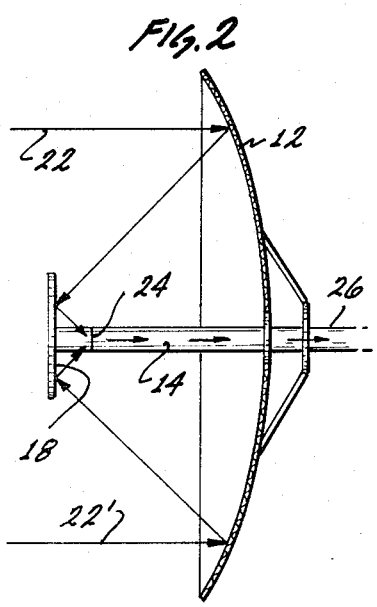
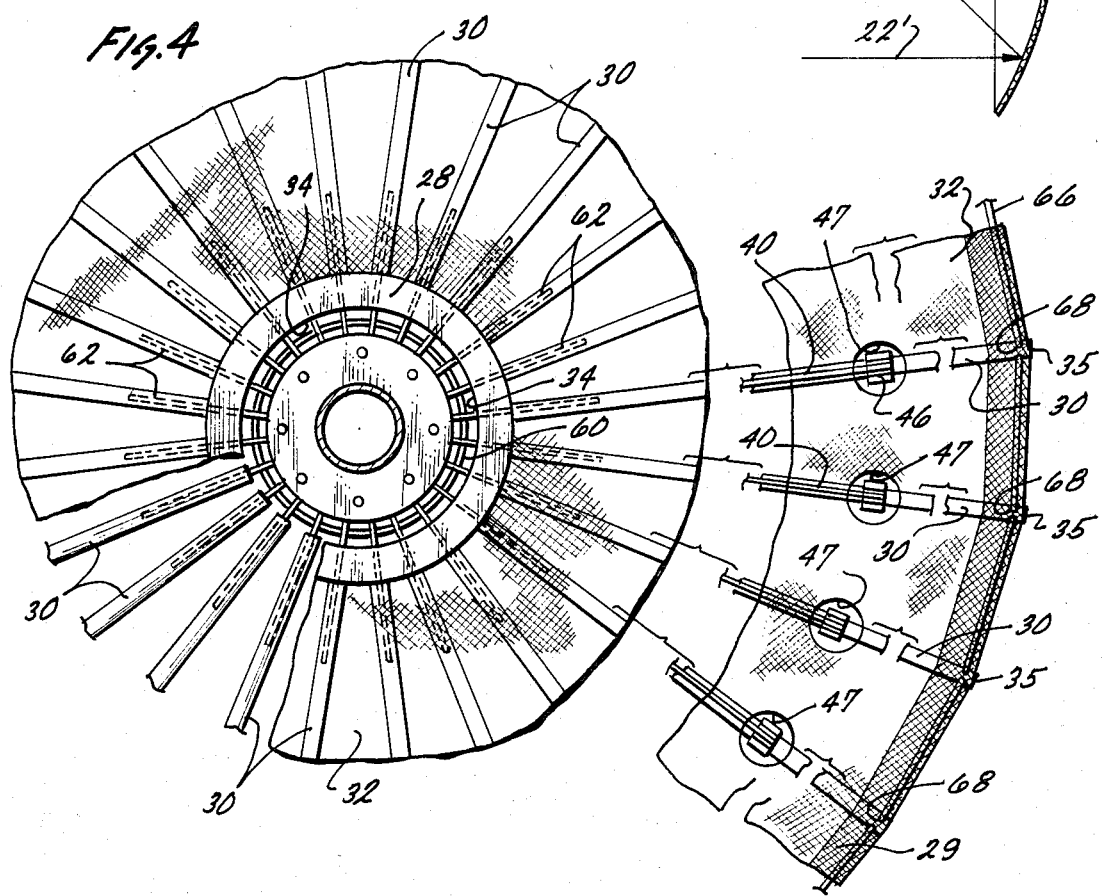

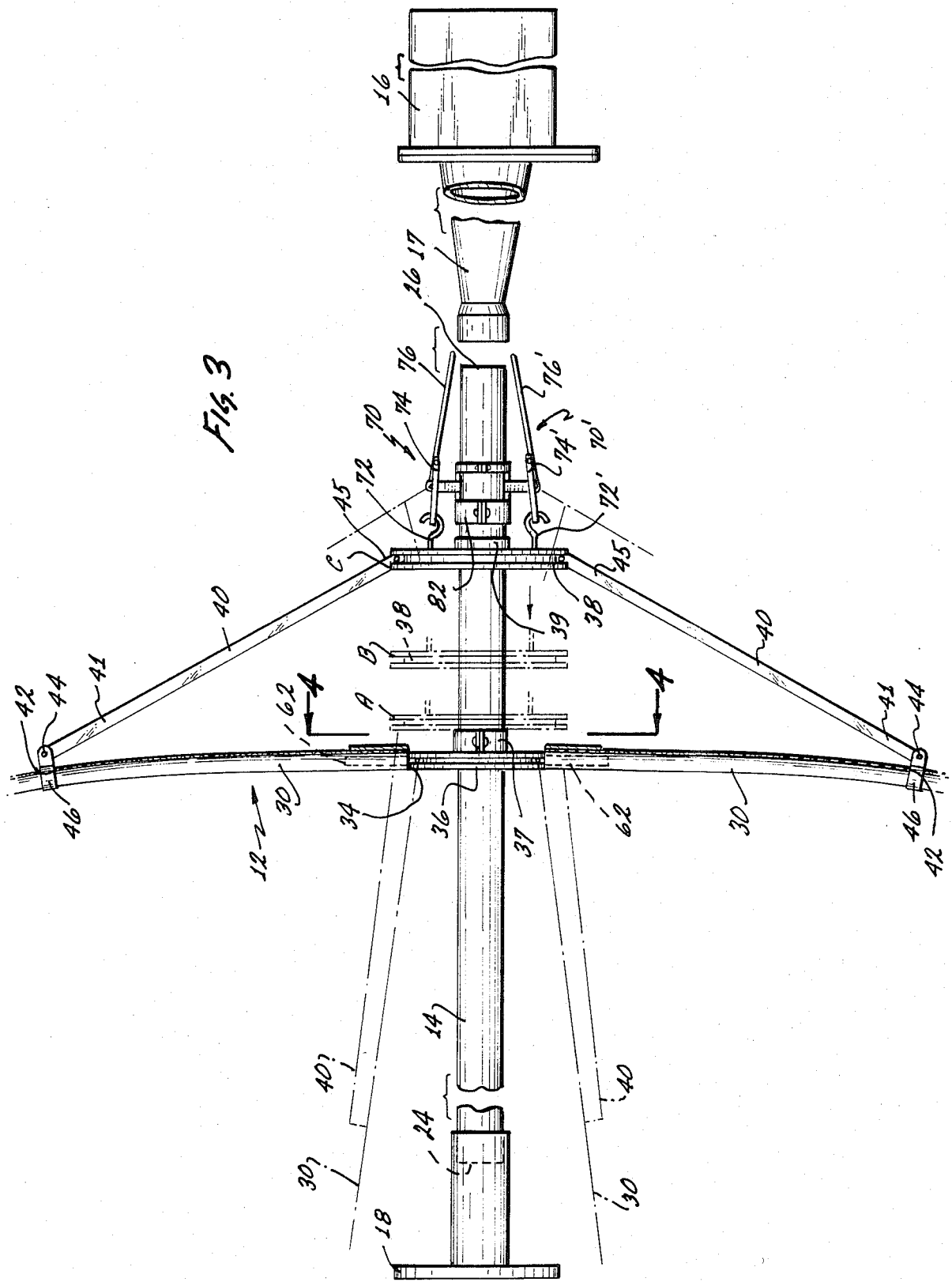

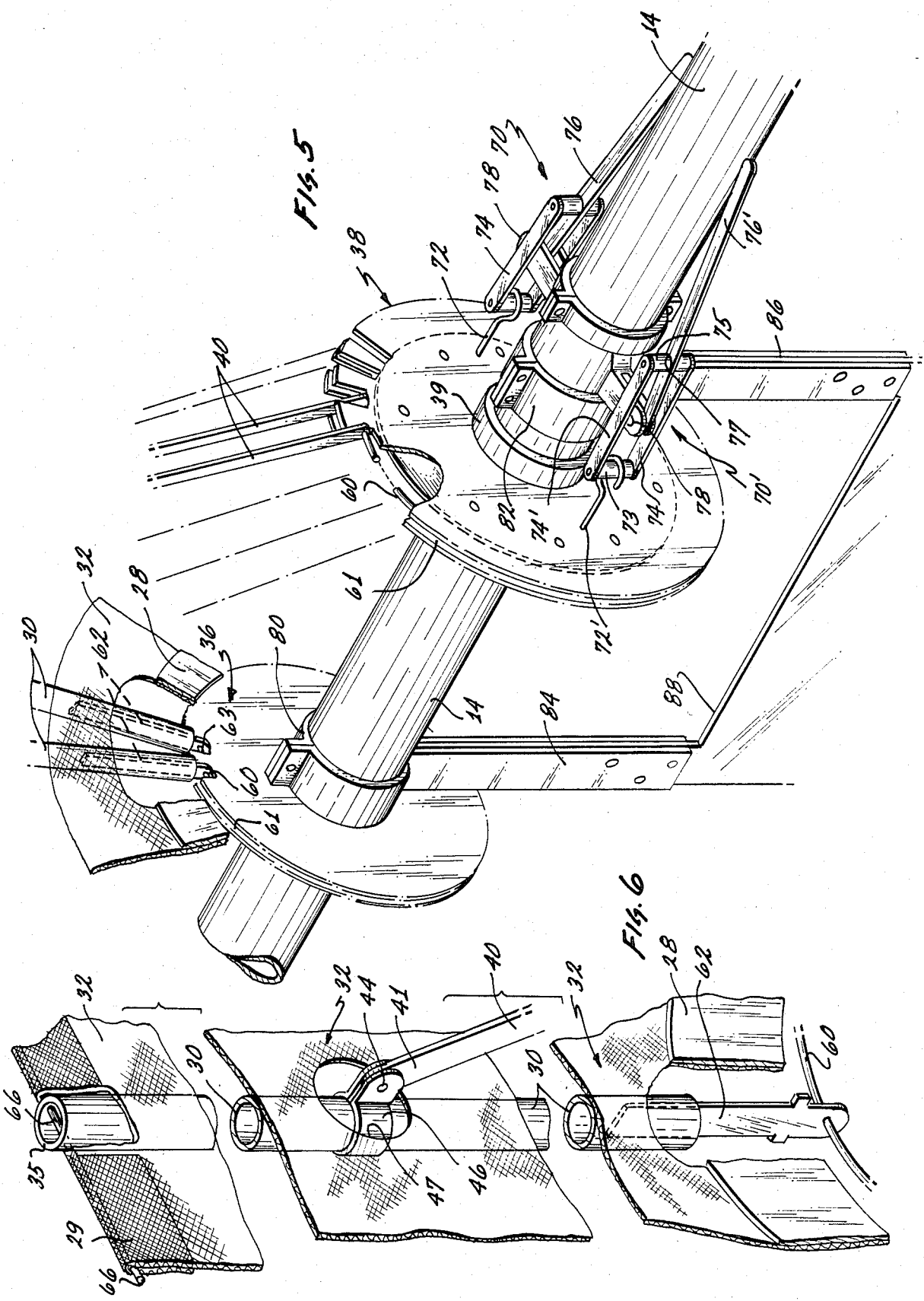

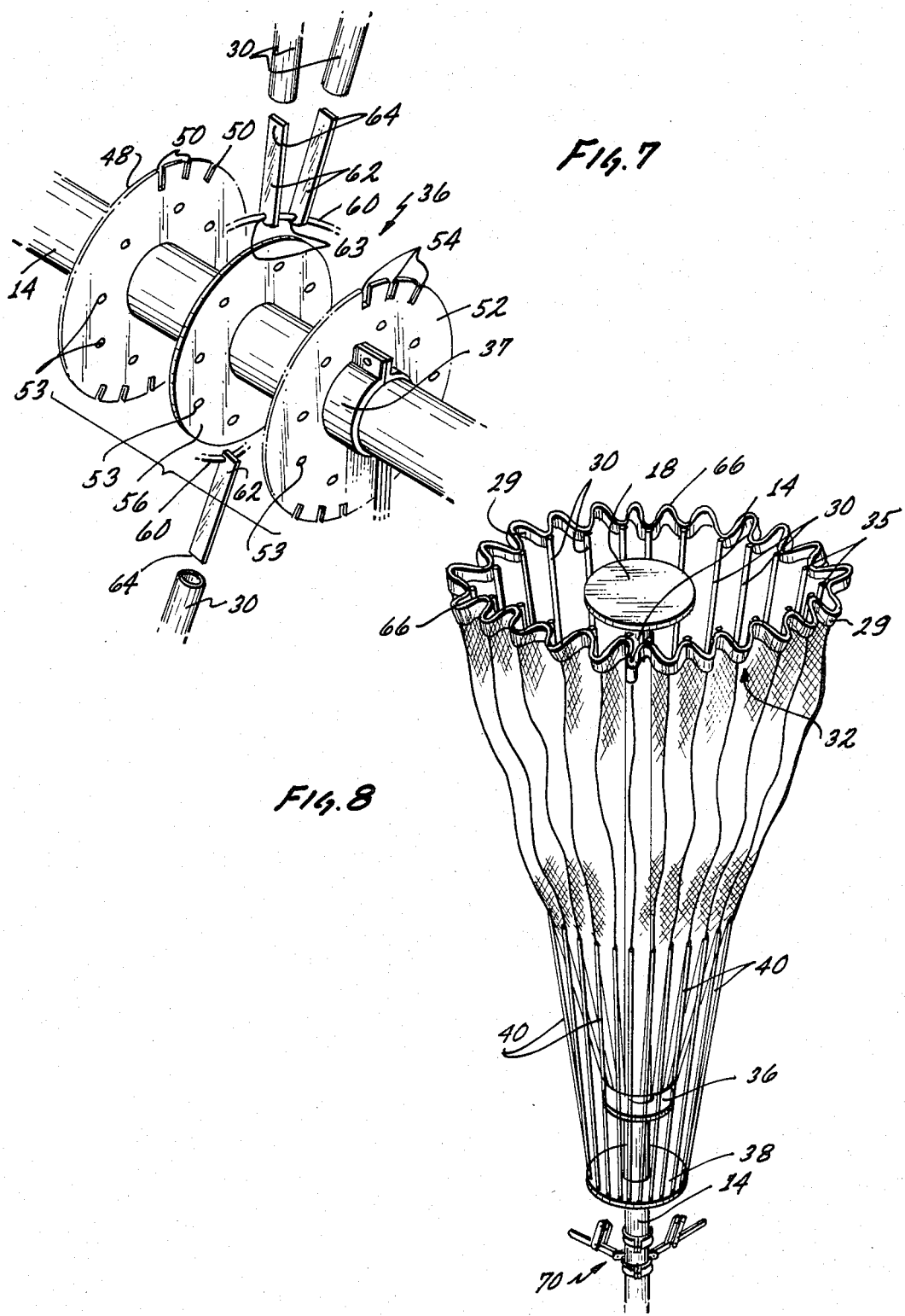

LIGHTWEIGHT FOLDING PARABOLIC REFLECTOR AND ANTENNA SYSTEM

BACKGROUND OF THE INVENTION

This is a continuation-in-part of applicant's co-pending application Ser. No. 247,922 filed Mar. 26, 1981, now abandoned, the content of which is hereby incorporated in its entirety by reference.

Field of the Invention

This invention relates generally to dished reflector structures and more particularly concerns a lightweight foldable parabolic reflector and a radio frequency antenna assembly incorporating the foldable reflector.

State of the Prior Art

Parabolic and spherical reflectors are known and have been used in the field of communications for transmission and reception of radio signals, such as in microwave communication links, space communications and radio telescopes. Such reflectors have also found application outside the communication areas, as, for example, in the solar energy field, where they are used to collect and concentrate solar radiation.

In the past, dished reflectors of significant diameter, e.g., 10 to 15 feet, have been heavy and unwieldy assemblies and very costly and inconvenient to transport and install. This was due to the requirement of a high level of accuracy in the curvature of the reflector dish in order to obtain high signal gain and to avoid signal phasing problems at the focal point of the dish. In the past, these considerations have generally required rigid reflector structures to achieve and retain precise curvatures.

In isolated instances it was found necessary to design parabolic or otherwise curved reflectors of folding construction, such that a reflector may be folded into a compact assembly for transportation and then deployed for use. Notably, such folding reflectors have found application in the space communications field, where space vehicles require relatively large antennas which are folded during launch within the limited space available, and are then deployed outside the earth's atmosphere.

The folding reflector structures of the known prior art have typically included a reflecting mesh supported by a skeleton framework of radial arms pivotally mounted to a central hub. The radial arms were manufactured to the desired curvature of the reflector dish and were constructed to rigidly retain this curvature. These reflectors are deployed by simply pivoting the radial arms from a generally axial folded position to a generally radial extended or deployed position without any change in the pre-formed curvature of the radial arm. Such precisely curved, pre-formed arms are very expensive to manufacture and become impractical for larger diameter dishes.

The prior art known to the applicant in connection with deployable dish structures is as follows:

*Paper No.* 100, authored by Löf and Fester, presented at the United Nations Conference on New Sources of Energy, held in Rome in August, 1971.

The Conference proceedings concerning the area of solar energy for heating purposes, originally entitled Volume 5, Solar Energy II, has been republished by Cloudburst Press of America, Inc., 2116 Western Avenue, Seattle, Wash. 98121. The title of the republished volume is unknown, but is identified as: ISBN 0-88930-031-3 (soft cover); ISBN 0-88930-032-1 (hard cover).

The referenced paper No. 100 is found at pages 262 through 264 of this republished volume. The deployable solar cooker disclosed in this paper does not teach the present invention in that it relies only on the curvature of the pre-formed dish of reflecting fabric. As described, the radial spokes are of spring metal and "flex only as forced by the fabric."

*Man's Greatest Adventure* by Laurence Allen, 1974, Library of Congress Card No. 74-17235, includes various photographs showing deployable antennas used on the lunar space mission. In particular, a small portable folded S-band dish antenna is shown at page 46. The S-band antenna photographs do not teach a folding stressed dish structure such as disclosed herein.

*The ARRL Antenna Handbook,* 1980, published by the American Relay League, shows at pages 254 and 255 a 12-foot stressed parabolic dish antenna. This structure is not deployable and radial spokes are stressed by guy wires attached to the focus feed support boom. The perimeter wire of the reference serves only as a peripheral support means for attaching nonelastic wire mesh segments to the rib skeleton to form a reflector surface.

It is contemplated by this reference that the dish be made portable by first removing the wire mesh, and then disassembling the rib structure.

SUMMARY OF THE INVENTION

The present invention improves over the prior art by providing a low-cost lightweight foldable reflector assembly of precise curvature which is repeatable through many folding-deployment cycles of the reflector and which can be made of relatively low f/d ratio. Cost and complexity is kept to a minimum by providing normally straight radial spokes for supporting a sheet of elastic knitted reflecting mesh. Neither the radial spokes nor the reflecting mesh are preformed to the required dish curvature, thus greatly reducing the cost of the reflector.

The preferred embodiment of the invention is a foldable reflector having a stressed radial framework comprising a plurality of radial spokes of tapered cross section and a substantially inelastic flexible perimeter cable connecting the tips of the poles or spokes.

The foldable spoke framework comprises a plurality of normally straight resiliently flexible rods radially mounted to a central hub for pivotal movement between a folded, generally axial position and a deployed, generally radially extended position. A cable or equivalent means is threaded through the tips of the spokes to define a perimeter calculated to have a diameter less than that of the fully deployed radial spokes. Thus, the perimeter cable operates to restrain the outer portion of the spokes against full radial deployment, causing the spokes to bend under stress. The length of the perimeter cable is calculated to produce a desired curvature of the spokes.

A sheet of resiliently elastic reflecting material such as a mesh of knitted metallized synthetic fabric is placed over the rear of the radial spoke framework and secured to the perimeter cable such that the mesh is stretched over the convex side of the stressed radial framework when the spokes are deployed. The elastic sheet is thus forced to assume the curvature of the stressed radial spokes so as to define a dished reflecting surface of predetermined curvature. In a preferred embodiment, the elastic sheet means is a single unitary sheet of knitted mesh. The mesh may be of knitted nylon 6 fiber embedded with silver particles or of copper plated dacron fiber, among other possible reflecting materials. The knitting is carried out by conventional methods to yield a mesh having good resiliency characteristics. The metallic finish is applied to the fiber by known and commercially available textile metallizing processes.

It is well known that if a straight horizontal beam of uniform cross section is clamped at one end and the beam is flexed by application of a perpendicular force or weight at the opposite end, the beam's curvature will approach a parabolic curve through the first few degress of arc, or about 10% of deflection. However, as the flexing force is increased to stress the beam to a greater curvature, the parabolic curve is quickly lost and the beam flexes to a greater extent at its center than at either end. Dish reflectors constructed with stressed, constant diameter radial rods are therefore limited to very shallow curvature. This limitation places the prime focal point of the dish far forward from the dish; in other words, the focal distance of the dish is relatively great, compared to the diameter of the dish. This relationship is commonly given as the f/d ratio.

It has been found that a stressed rod or beam of tapering cross section will retain a parabolic curvature through a substantially greater arc of deflection than is possible with a rod of uniform cross section. Thus, reflector dishes of greater curvature and lower f/d ratio can be obtained. The taper produces a gradient in the stiffness of the rod such as to produce a desired curvature when the tip of the rod is stressed.

In reception of microwave signals it is often desirable to reduce the antenna noise figure and to suppress side lobe patterns by decreasing the antenna's f/d ratio. It is therefore one object of this invention to achieve reflectors having a relatively low f/d ratio, e.g., less than 0.6.

The novel reflector structure enables the construction of a folding reflector antenna which can be quickly and easily deployed and mounted on a tripod or other simple support structure, and can be easily and precisely aimed.

The preferred reflector antenna assembly is a Cassegrain arrangement with an axial waveguide, a large primary reflector mounted to and supported by the waveguide for reflecting electromagnetic radiation towards the front of the waveguide and a smaller secondary or subreflector mounted at the front of the waveguide for reflecting the radiation into the waveguide.

Such construction for a relatively large, i.e., 10- to 15-foot diameter folding antenna is novel over the known prior art in that the waveguide also serves as the primary support for both the large main reflector and the smaller subreflector. Stated conversely, in a folding dish reflector which requires an axial support for a slidable element operative to fold and unfold the dish, the required axial support member also serves as a waveguide.

A low-noise amplifier housing may be attached, through a suitable transition, directly to the open rear end of the waveguide behind the main reflector. In a preferred embodiment the low noise amplifier and any desired frequency converters can be mounted directly within the rear end of the waveguide without necessity of any additional housing or transition. This technique is useful at frequency ranges which call for a waveguide diameter sufficiently large to accommodate the amplifier's electronics, and results in considerable cost savings. The weight of the amplifier counter-balances the weight of the forward portion of the waveguide and the secondary reflector attached thereto, the entire unitary assembly being detachably supported at the waveguide, preferably behind the main reflector assembly.

The tapered spokes are retained in a stressed, radially extended position during use of the reflector and are released to a generally axial, unstressed, folded position for transportation or storage of the reflector assembly.

The perimeter cable also provides a means for adjusting to a fine degree the final curvature of the dish in the deployed position by making adjustments to the perimeter length defined by this cable.

BRIEF DESCRIPTION OF THE DRAWINGS

FIG. 1 is a rear perspective view of a portable parabolic dish antenna incorporating the foldable reflector of this invention;

FIG. 2 is a schematic cross section showing the optics of the antenna of FIG. 1;

FIG. 3 is an axially broken cross section taken along line 2—2 of FIG. 1 showing the pivotal mounting of the main reflector spokes to the axial waveguide, the secondary reflector, and the amplifier housing with the transition for mounting to the rear end of the waveguide;

FIG. 4 is a cross section taken along line 4—4 of FIG. 3 showing the main reflector assembly in three radially broken apart sections, the innermost section showing the mounting of the radial spokes to the central hub and the reflecting mesh extending thereabout, the intermediate section showing the connection of the pivot levers to the radial spokes, and the outermost section showing the perimeter cable threaded through the spoke tips and the reflecting fabric attached thereto;

FIG. 5 is a partial perspective view of the pivotal mounting of the radial spokes and pivot levers to their respective hubs on the axial waveguide together with the pivot lever locking assembly and an antenna support bracket;

FIG. 6 is a partial rear perspective view of a single radial spoke and the reflecting mesh in three radially broken apart sections showing the preferred pivotal mounting of the spoke to the retaining ring of the stationary central hub, the hinged connection of a pivot lever to an intermediate portion of the radial spoke, and the perimeter cable passing through the tip of the spoke with the mesh secured thereto;

FIG. 7 is an exploded perspective view of the preferred central hub assembly and the pivotal mounting of the radial spokes thereto;

FIG. 8 shows the antenna of this invention with the spokes and the reflecting fabric in folded position.

DETAILED DESCRIPTION OF THE INVENTION

Although the following description is made primarily in connection with a radio receiving antenna suitable for reception of satellite television transmissions in the three to four gigahertz frequency band, it will be understood that the folding dish reflector structure of this invention is not limited to this particular application.

Turning now to FIG. 1 of the drawings, a receiving antenna 10 comprises a main reflector 12 in the form of a parabolic dish supported on an axial metallic tube 14 which is both the main support for the various components of the antenna system as well as being a waveguide for transmission of electromagnetic waves from the focal point to a receiver amplifier 16 mounted to the rear end of the waveguide 14. A smaller secondary reflector 18 is mounted to the front end of the waveguide 14 and supported entirely thereby. The entire antenna assembly is supported by a tripod 20 through a bracket preferably attached only to the waveguide 14 at a point intermediate the main reflector 12 and the amplifier 16.

FIG. 2 shows the optics of the receiving antenna 10, where incident rays 22 and 22' are reflected by the parabolic reflector 12 towards the front of the axial waveguide 14 where the rays are again reflected by the secondary reflector 18 towards the open front end 24 of the waveguide 14. The electromagnetic wave is transmitted down the length of the waveguide 14 towards the rear end 26 of the waveguide.

The dished reflector 12 of FIG. 1 is constructed of a plurality of evenly spaced radial spokes 30 mounted to the waveguide 14, and a sheet 32 of lightweight, resiliently elastic reflecting mesh stretched over the rear of the radial spoke assembly and secured to a perimeter wire 66 connecting the tips of the spokes.

The presently preferred spokes 30 are tapered, normally straight, resiliently flexible rods of circular cross section and hollow construction. In a preferred embodiment a parabolic reflector 10' in diameter is constructed with hollow fiberglass rods 5' in length and having a wall thickness of 1/16", and tapering from a maximum internal diameter of ½" at the butt end to an internal diameter of 5/16" at the tip. With the specified spoke dimensions a focal length of approximately 5' can be obtained, yielding a 0.5 f/d ratio. The optimal taper of the rods will vary with the desired diameter and f/d ratio of the finished dish reflector, i.e., with the length and desired curvature of the spokes.

A 12' dish of similar f/d ratio can be constructed with 6' rods having the same rate of taper as the 5' rods. The length of the rods is extended to 6' and the taper continued, to terminate in an inside diameter of 5/32".

The tapering cross section creates a gradient in the stiffness of the rod along its length. By varying this gradient, different curvatures may be obtained. One simple way of determining whether a given rod taper is suitable for use in a reflector of given f/d ratio is to load the rod to the same extent that it would be in the reflector, and cast a shadow of the stressed rod onto a surface on which has been drawn the desired curve. No method other than such empirical ones of trial and error are known for calculating the rod tapers.

A spherical dish reflector can be constructed by making the spokes more flexible towards the tip end to obtain a greater curvature than would be necessary to construct a parabolic reflector.

Turning now to FIG. 3, the waveguide 14 is seen to consist of a straight metallic tube having a front end 24 and a rear end 26 and open at both ends. The tube 14 is of a suitable metallic substance such as aluminum or a steel alloy having sufficient strength to provide adequate relatively rigid support for the main reflector 12, as well as the secondary reflector 18 and amplifier housing 16 mounted at the front and rear ends respectively. The internal diameter of the tube 14 is chosen such that it serves as a waveguide for electromagnetic radiation at a desired frequency band.

The foldable radial spoke structure is made by pivotally mounting each spoke to a stationary hub which is secured to the waveguide 14. In FIG. 3, one pair of radially opposite spokes 30 are shown mounted at their radially inner butt ends 34 to a central hub structure 36. The hub 36 is in turn affixed to the waveguide 14 as by welding to a collar 37 or by any other suitable means. A second hub structure 38 of somewhat larger diameter is mounted for sliding movement along the waveguide 14 rearwardly of the first hub 36. Preferably, a short collar 39 is affixed to the hub 38 coaxially therewith to keep it from wobbling. A pivot lever or linkage rod 40 connects the second hub 38 to an intermediate point 42 along each of the radial spokes 30. The levers 40 are connected for pivotal movement by pin 44 to a U-clip 46 secured at point 42 to the radial spokes 30. Each one of the radial spokes 30 and the levers 40 are mounted for pivotal movement at their radially inner ends to the respective central hubs, as illustrated in FIGS. 4-7. The sliding hub 38 is of enlarged diameter to thereby space the levers 40 radially outwardly about the spokes 30 in the folded position, as shown in dotted lines in FIG. 3.

The presently preferred structure of the central hubs 36 and 38 is best understood in the exploded view of FIG. 7. A first disc 48 has evenly spaced radial slots 50 formed therein and is centrally perforated for receiving the axial tube 14. A second disc 52 is similarly centrally apertured and also includes radial slots 54 in register or alignment with the radial slots 50 of the first disc 48. A spacer disc 56 of reduced diameter is interposed between the first and second discs 48 and 52 respectively such that an annular space or groove 61 (best seen in FIGS. 3 and 5) is defined between the discs 48 and 52 when they are brought into opposing abutting relationship with the spacer 56. An annular retaining wire or ring 60 shown in broken portions only in FIG. 7 loosely encircles the spacer 56 within the annular space between the first and second discs 48 and 52. A mounting member 62 of elongated planar configuration is provided for each radial spoke and has formed at one end a hole 63 through which passes the annular retaining ring 60, each mounting member 62 being retained by the ring 60 within one aligned pair of grooves 50, 54 of the spaced discs 48 and 52. The members 62 are thus free to pivot about the wire 60 in a plane perpendicular to the discs 48 and 52, while the members 62 are retained in fixed radially spaced relationship within the aligned grooves 50 and 54. The radially outer end 64 of each mounting member 62 is received within the hollow interior of one radial spoke 30 and secured therein.

In this fashion, the spokes 30 are mounted to the hub assembly for pivotal movement between a generally axial folded position and a generally radial or extended position. The discs 48 and 52 are affixed to the spacer 56 by suitable means such as riveting at holes 53. Preferably, each hub is provided with a short collar coaxial with the waveguide 14 for improved support.

Referring to FIG. 5, the simultaneous pivotal movement of the radial spokes 30 is effected by means of levers or linkage rods 40 which are preferably straight elongated members formed of sheet metal such as aluminum or steel, and are pivotally attached at one end to the radial spokes and pivotally connected at the opposite or rear end to a hub 38 of construction similar to that of hub 36, as described above. Hub 38, however, is mounted to the axial support or waveguide 14 for sliding movement along the axial support rearwardly of the fixed hub 36. The pivotal movement of the radial spokes between the folded and the extended positions is thus effected by sliding movement of the sliding hub 38, the movement of the sliding hub 38 being transmitted to the pivoting spokes 30 by the levers 40.

The linkage rods or levers 40 are connected to the radial spokes 30 for pivotal movement, as best shown in FIG. 6. The forward or radially outer end 41 of the lever 40 is attahced at pivot pin 44 to a U-clip 46 secured to the radial spoke 30. The position of the U-clip will determine the amount of leverage obtained through the linkage rods 40. That is, the greater the outward radial displacement of the clip 46 from the waveguide, the greater the leverage that will be obtained to deploy the reflector. For a reflector of 10 feet to 15 feet in diameter it has been found adequate to place the clips 46 within a range of 10 inches to 20 inches from the butt end of the spoke 30, the preferred point being 14" from the center for a spoke length of 5'. The clip 46 is attached to the lever 40 through an opening 47 formed in the sheet 32 of reflecting mesh stretched over the rear of each spoke.

The radial spokes 30 are normally straight in the unstressed folded position as shown in phantom position A in FIG. 3 and also in FIG. 8. As the tapered radial spokes 30 are pulled back and are pivoted to the radially extended position, the spokes 30 are stressed to the desired curvature by the cable perimeter 66 secured to the tip 35 of each spoke. The perimeter cable may be a relatively thin flexible steel cable such as is readily available commercially.

In the preferred embodiment, the cable 66 is threaded through openings 68 in the tips 35 of the spokes, as best illustrated in FIGS. 4 and 6, to form a perimeter of reduced diameter, that is, a diameter less than the unstressed diameter of the fully extended radial spokes 30. The spokes are curved to the desired shape by the cable and no reliance is placed on the shape of the dish reflector surface to obtain a given spoke curvature. Thus, as the radial spokes 30 are pivoted to the radially extended position, increasing resistance against such deployment will be encountered due to the effect of the restricted perimeter of the cable 66.

In a relatively large dish, such as 10' to 15' in diameter, and using fiberglass radial spokes of the specified thickness, it has been found that it is difficult to fully deploy the reflector through direct manual force against the aforedescribed stress forces. To aid in the quick and easy deployment of the dish reflector, a pair of over-the-center cam locks 70 and 70', best seen in FIG. 5, are affixed to the axial support or waveguide 14 rearwardly of the sliding hub 38. Hub 38 is provided with a pair of rearwardly extending hook members 72 and 72', which are preferably threaded into the hub 38, such that the hooks may be threaded into and out of the hub 38 to adjust the effective length of the hook members actually extending rearwardly of the hub 38. Each over-the-center cam lock 70, 70' has a cam or retaining member 74 for engaging one of the hooks 72, 72' respectively, and a lever 76 which is pivotally mounted at one end to the axial support or waveguide 14 at pivot point 78. The cams 74 are elongated members adapted at one end 73 for engaging a hook 72, 72' and being pivotally attached at their opposite end 75 to an intermediate point 77 on lever 76 which is spaced from pivot point 78. The levers can be manually pivoted from the phantom position in FIG. 3 for applying rearwardly directed force to the retaining member 74, thus pulling back the hub 38 through the hook members 72, 72'. The over-the-center cam lock pair 70, 70' thus serves the dual function of leveraging the manual force applied to the levers 76 to facilitate the full deployment of the dished reflector against resistance of the spokes, as well as serving to lock and retain the hub 39 at its rearmost position to thereby retain the reflector in stressed fully deployed position. The hub 38 is released for folding the reflector by pivoting the levers 76 to a forward position as shown in phantom line in FIG. 3, and then disengaging the hooks 72 from the retainer 74. Thus, the reflector can be partially deployed by manually unfolding the dish-spoke assembly as represented by movement of the sliding hub 38 in FIG. 3 from the phantom position A to the phantom position B. As increasing resistance is met, the over-the-center cams are engaged with the hooks 72, 72' for movement of the hub 38 to the solid-line position C, this rearmost position of the hub 38 corresponding to full deployment of the reflector dish.

It will be appreciated that the rearmost position of the sliding hub 38 is adjustable by means of the threaded hooks 72, 72', which position in turn determines the stress or rearward force applied to the spokes at points 42 by the levers 40. The curvature of the central portion of the dish 12 is thus adjustable by threading the two hooks 72, 72' into and out of the corresponding threaded bores in the sliding hub 38.

The periphery of the reflector dish can be adjusted for optimum curvature by approriate adjustment of the cable perimeter 66, as has been explained.

The reflector of this invention may thus be provided with means for independently adjusting the curvature of the peripheral, radially outer area of the reflector dish, and the central, radially inner area of the reflector. The curvature of the disc can be checked against a template and corrections made as necessary.

The secondary disc reflector 18 may be affixed to the front end 24 of the waveguide 14 by means of a sleeve 19 which fits at its rear end over the open front end 24 of the waveguide and is securely affixed to the center of the secondary reflector disc 18 at its opposite end. The cylinder 19 closes the front end of the waveguide against entry of foreign matter, debris and moisture, but is made of a material transparent to electromagnetic radiation, such as plastic or plexiglass. Thus, the radiation focused by the main reflector dish 12 is reflected without hindrance into the front end of the waveguide 14 by the secondary reflector 18. Alternatively, the cylinder may be replaced by a plug which fits at its rear end into the open end 24 of the waveguide.

The preferred reflecting fabric is a mesh knitted by known methods to produce a resiliently elastic sheet from a fiber such as nylon 6 and treated by commercially available textile metallizing processes to obtain a metallic reflecting finish. The mesh may be of open construction to offer low wind resistance but the size of the mesh openings must be small enough so as to present a reflecting surface at the desired radio frequency. The fiber of the mesh should be selected to minimize sag due to repeated stretching of the fiber.

A single sheet of such elastic mesh is applied to the rear of the radial spoke assembly by first deploying the spokes until resistance from the perimeter cable is first encountered and the spokes are still straight. The elastic mesh is apertured at the center and provided with a reinforcing collar 28. The levers 40 are detached from the sliding hub 38, and the collar 28 is slipped over the rear end of the waveguide 14 and over the sliding hub 38 until it lies against the radially extending spokes 30. The mesh is then stretched evenly to take out the slack until the mesh is taut from the central collar 28 to the perimeter cable 66. The mesh is then secured to the cable along its length by doubling the mesh over the cable to make a hem 29 along the peripheral edge of the mesh 32, and the hem is secured by any suitable means, such as taping or stapling. When the spoke assembly is fully deployed to the stressed position the mesh will be elastically stretched over the convex side of the curved spokes and defines a dished reflecting surface closely conforming to the predetermined curvature of the spokes.

It will be noted that the mesh 32 need not be secured except at its outer edge to the perimeter cable 66 by the hem 29. Specifically, the collar 28 does not require any support and is kept centered by the stretched reflective mesh However, the mesh 32 may also be secured along the length of the spokes 30, from the collar 28 to the hem 29, if so desired. It will be appreciated that yet other means may be resorted to for attaching the mesh to the radial framework consisting of the radial spokes 30 and the perimeter cable 66, the object being to obtain a substantially wrinkle-free reflecting surface closely conforming to the curvature of the stressed spokes.

A preferred material for the radial spokes is fiberglass, the rods being made by known processes such as by winding resin impregnated fiberglass cloth on a tapered core, the core being withdrawn after hardening of the resin. The taper of the rods is determined by the shape and diameter of the core as well as the thickness of the fiberglass cloth wound onto the core. Such methods are known and commonly practiced, as, for example, in the manufacture of fiberglass fishing rods. The invention is not restricted to hollow spokes, and other materials may be found equally suitable, such as carbon, graphite, metal and others. Fiberglass is preferred in that it is a low cost, readily available material of great resiliency, largely impervious to weather, and very durable.

The housing 16 for a low noise amplifier can be mounted to the rear end 26 of the waveguide 14 by means of a mating transition 17 as shown in FIG. 3. In certain frequency ranges the waveguide tube 14 can be made of internal diameter sufficient to accommodate the electronic circuits of a low noise amplifier as well as any associated circuits wihtout need for a separate amplifier housing. This is specifically possible in the 3-4 gigahertz range, to further simplify the antenna structure.

The antenna assembly may be supported as in FIG. 5 by means of a bracket 88 attached to the waveguide 14 by means of arms 84 and 86 and braces 80 and 82, the bracket in turn being mounted to a tripod or equivalent structure.

While one particular embodiment of the invention has been described and illustrated, it will be apparent that various modifications and substitutions are possible without departing from the scope of the invention as defined in the following claims.

What is claimed is:

1. A reflector antenna assembly comprising:
   a waveguide having a front end and a rear end and being open at both ends to electromagnetic radiation;
   a foldable primary reflector supported by said waveguide for reflecting electromagnetic radiation towards said front end of said waveguide, said primary reflector including
   a plurality of resiliently flexible normally straight spokes of diminishing stiffness along a radially outward direction such that each spoke is stressable to a desired reflector curvature, each spoke having an inner end and a tip, said inner ends being mounted for pivotal movement between a folded axial position and a deployed radial position relative to said waveguide;
   restricting means connected to the radially outer tips of said spokes for restricting said spokes against full radial deployment;
   means for simultaneously urging each of said radial spokes towards a fully radially deployed position whereby said spokes are stressed by said restricting means to a predetermined curvature;
   elastic sheet means of reflecting material deployable by said spokes and conforming to the curvature of said stressed spokes to define a dished reflecting surface;
   means for retaining said spokes in said stressed deployed position; and
   a secondary reflector mounted to said front end of said waveguide for reflecting said radiation into said waveguide.

2. The reflector assembly of claim 1 wherein said means for urging comprise
   a movable member slidable along said waveguide rearwardly of said spokes;
   lever means operatively connected between said spokes and said movable member for effecting simultaneous pivotal movement of said spokes by sliding movement of said movable member.

3. The reflector assembly of claim 1 or claim 2 wherein said means for retaining comprise lock means engageable with said movable member for retaining said movable member in a selected position along said waveguide, said selected position being adjustable for adjusting the curvature of said spokes in said stressed extended position.

4. The reflector assembly of claim 1 wherein said spokes of diminishing stiffness are of tapering cross section in a radially outward direction and are pivotally mounted at their thicker radially inner ends.

5. The reflector assembly of claim 1 wherein said restricting means comprise means connecting the radially outer ends of said spokes for stressing said spokes to a predetermined curvature in said radially extended position.

6. The reflector assembly of claim 1 or claim 5 wherein said restricting means comprise substantially inelastic flexible perimeter cable means connecting the spoke tips.

7. The reflector assembly of claim 1 or claim 2 wherein said elastic sheet means comprise a resiliently elastic metallized knitted mesh.

8. The reflector assembly of claim 7 wherein said restricting means comprise a perimeter cable attached to the tip of each said spoke and said knitted mesh extends over the rear of said radial spokes and is attached to said perimeter cable such that said mesh conforms to the curvature of said spokes upon deployment of the spokes to said stressed position.

9. The reflector assembly of claim 1 or claim 2 wherein said secondary reflector is mounted to said front end of said waveguide by an intermediate support member transparent to said electromagnetic radiation but closing said front end of said waveguide against penetration of matter.

10. The reflector assembly of claim 1 or claim 2 wherein said waveguide is a metallic tube open at said front end, and said secondary reflector is a disc affixed to a non-metallic support member, said support member being attachable to and closing said one end of said tube, said support member being transparent to electromagnetic radiation.

11. The reflector assembly of claim 10 further comprising electronic amplifier means enclosed within said waveguide for receiving said radiation reflected into said waveguide by said secondary reflector.

12. A reflector antenna assembly comprising:

a waveguide having a front end and a rear end and being open at both ends to electromagnetic radiation;

a subreflector mounted to said front end of said waveguide for reflecting radiation into said waveguide; and a foldable primary reflector supported by said waveguide for reflecting electromagnetic radiation towards said front end of said waveguide, said primary reflector including;

a plurality of normally straight resiliently flexible radial spokes each having a butt end and a tip, each of said spokes diminishing in stiffness from said butt end towards said tip such that each spoke is stressable to a desired reflector curvature, said spokes being mounted at their thicker radially inner butt ends to said waveguide for pivotal movement between an extended generally radial position and a folded generally axial position;

means for stressing said spokes in said extended position to a predetermined curvature, said spokes being relieved of said stress in said folded position to thereby resume said normally straight attitude;

resiliently elastic sheet means of reflecting material deployable by said spokes and conforming in said extended position to said predetermined curvature of said stressed spokes to define a dished reflecting surface;

lever means connected to each of said spokes for effecting simultaneous pivotal movement of said spokes between said stressed extended position and said folded position; and lock means engageable for retaining said spokes in said stressed, radially extended position.

13. The reflector assembly of claim 12 wherein said radial spokes are pivotally mounted to a fixed hub assembly affixed to said waveguide, said hub assembly comprising:

means defining a plurality of radial slots;

mounting means positioned within each of said radial slots and secured to one of said radial spokes;

means pivotally retaining said mounting means within said radial slots such that said mounting means and and radial spokes are retained in radially spaced relationship and said mounting means are free to pivot with its attached radial spoke within said radial slots.

14. The reflector assembly of claim 13 wherein said lever means comprise a plurality of levers and each of said levers is connected at one end thereof to an axially slidable hub assembly of enlarged diameter with respect to said fixed hub.

15. The reflector assembly of claim 14 wherein said slidable hub assembly comprises:

means slidable along said waveguide and means defining a plurality of radial slots;

means pivotally retaining one end of each of said levers within said radial slots such that said levers are maintained in radially spaded relationship, the other end of each of said levers being pivotally attached to one of said radial spokes, whereby said radial spokes are pivotable responsively to sliding movement of said slidable means.

16. The reflector assembly of claim 12 wherein said lever means comprise a plurality of radial linkage rods each rod being pivotally connected at its radially outer end to one of said spokes and being pivotally connected at its radially inner end to a hub assembly slidable along said waveguide rearwardly of said spokes.

17. The reflector assembly of claim 15 wherein said slidable hub assembly comprises:

first and second discs concentric with said waveguide and defining a plurality of aligned radial slot pairs;

means pivotally retaining one end of said lever means within said radial slots such that said levers are retained in radially spaced relationship about said waveguide and are pivotable in a plane perpendicular to said discs.

18. The reflector assembly of claim 12 or claim 17 wherein said lever means comprise a plurality of levers and each of said levers is connected to one of said spokes at a point located within the radially inner half of the spoke.

19. The reflector assembly of claim 12 further comprising:

a movable member slidable along said waveguide rearwardly of said spokes;

said lever means being operatively connected between said spokes and said movable member for effecting simultaneous pivotal movement of said spokes by sliding movement of said movable member;

said movable member being engageable by said lock means for retaining said movable member in a selected position along said waveguide, said selected position being adjustable for adjusting the curvature of said spokes in said stressed extended position.

20. The reflector assembly of claim 12 wherein said means for stressing comprise substantially inelastic cable means connecting the radially outer tips of said spokes for stressing said spokes to a predetermined curvature in said radially extended position.

21. The reflector assembly of claim 20 wherein said inelastic cable means is a perimeter cable connecting the tips of said spokes.

22. The reflector assembly of claim 20 or claim 21 comprising means for adjusting said inelastic cable means to thereby adjust the curvature of the radially outer portion of said reflecting surface.

23. The reflector assembly of claim 12 or claim 20 wherein said lock means are engageable for retaining said lever means in a rearmost position corresponding to said stressed fully deployed position of said spokes;

and further comprising means cooperative with said lock means for adjusting the retained position of said lever means to thereby adjust the curvature of the central portion of said reflecting surface.

24. The reflector assembly of claim 1 or claim 12 further comprising means for adjusting the curvature of said radial spokes in said stressed radially extended position.

25. The reflector assembly of claim 1 or claim 12 wherein said spokes are tapered rods pivotally attached to said waveguide at their thicker radially inner ends.

26. The reflector assembly of claim 25 wherein said tapered rods are hollow tapered fiberglass rods.

27. The reflector assembly of claim 25 wherein said tapered rods are of cylindrical cross section.

28. The reflector assembly of claim 13 wherein said lock means are engageable for retaining said lever means in a rearmost position corresponding to said stressed fully deployed position of said spokes;

and further comprising means cooperative with said lock means for adjusting the retained position of said lever means to thereby adjust the curvature of the central portion of said reflecting surface.

29. The reflector assembly of claim 5 further comprising means for adjusting said restricting means to thereby adjust the curvature of the radially outer portion of said reflecting surface.

30. The reflector assembly of claim 12 wherein said resiliently elastic sheet is a knitted mesh.

31. The reflector assembly of claim 21 wherein said resiliently elastic sheet is a unitary sheet extending over the rear side of the radial spoke assembly and secured along its perimeter to said perimeter cable, said unitary sheet being apertured to allow passage of said waveguide through its center and to permit said lever means to be connected to said radial spokes, whereby said unitary sheet is stretched by said perimeter cable over the convex side of said spokes in said stressed deployed position to define said dished reflecting surface.

32. The reflector assembly of claim 12 or claim 31 wherein said elastic sheet is secured to said radial spokes.

33. The reflector assembly of claim 32 wherein said elastic sheet is secured to each of said radial spokes along substantially the full length of each spoke.

34. A foldable reflector assembly comprising:
an axial support member having a front end and a rear end;
a plurality of normally straight resiliently flexible radial spokes of diminishing stiffness in a radially outward direction such that each spoke is stressable to a desired reflector curvature, each spoke having a butt end and a tip, said spokes being mounted at their radially inner ends to said axial support for pivotal movement between an extended generally radial position and a folded generally axial position;
substantially inelastic flexible cable means connected to the radially outer tip of each said spoke for stressing said spokes to a predetermined curvature in said radially extended position, said spokes being relieved of said stress in said folded position to thereby resume said normally straight attitude;
resiliently elastic sheet means of reflecting material deployable by said spokes such that said elastic sheet means conforms to the curvature of said stressed spokes in said extended position to present a dished reflecting surface towards said front, the curvature of said stressed radial spokes being substantially unaffected by said elastic sheet means;
means connected to each of said spokes for effecting simultaneous pivotal movement of said spokes between said folded position and said extended position; and
means releasably engageable for retaining said spokes in said stressed; extended position.

35. The reflector assembly of claim 34 wherein said cable means defines a perimeter connecting the tips of said spokes and wherein said elastic sheet means are attached along its periphery to said cable means, such that said elastic sheet means are stretched over the convex side of said stressed radial spokes in said extended position to define said dished reflecting surface.

36. The reflector assembly of claim 34 or claim 35 wherein said elastic sheet means are attached to each of said radial spokes.

37. The reflector assembly of claim 34 or claim 35 wherein said elastic sheet means comprises a unitary sheet of knitted metallized mesh.

38. A reflector antenna comprising:
an axial metallic tube having an open front end and an open rear end and having an internal diameter dimensioned for use as a waveguide for electromagnetic waves in a given frequency range;
a plurality of normally straight resiliently flexible radial spokes of tapered cross section, each having a butt end and a tip, mounted at their thicker radially inner butt ends to said waveguide for pivotal movement between an extended generally radial position and a folded generally axial position;
inelastic flexible cable means connecting said spokes at their tips to form a perimeter of reduced diameter so as to stress said tapered spokes to a predetermined curvature, said resilient spokes being relieved of said stress in said folded position to thereby resume said normally straight attitude;
resiliently elastic reflecting mesh means attached so as to be deployable by said spokes in said extended position to form a dished reflector closely conforming in curvature to said stressed spokes, the curvature of said stressed spokes being substantially unaffected by said reflecting mesh;
a subreflector for reflecting radiation focused by said dished reflector into said front end of said metallic tube;
hub means slidable along said tube rearwardly of said spokes;
a plurality of levers each pivotally attached at one end thereof to one of said tapered spokes at a point along the radially inner half of said spoke, the opposite end of each said lever being pivotally attached to said slidable hub means, whereby said spokes may be simultaneously moved from said folded to said extended position by rearward sliding axial movement of said hub; and,
means for releasably retaining said slidable hub means in said rearward position against said stressed spokes.

* * * * *

UNITED STATES PATENT AND TRADEMARK OFFICE
CERTIFICATE OF CORRECTION

PATENT NO. : 4,527,166
DATED : July 2, 1985
INVENTOR(S) : Robert A. Luly

It is certified that error appears in the above-identified patent and that said Letters Patent are hereby corrected as shown below:

Column 1, line 8 delete "now abandoned", and in item [63] in the heading the word ",abandoned" should be deleted.

Signed and Sealed this

Twenty-ninth Day of October 1985

[SEAL]

Attest:

DONALD J. QUIGG

Attesting Officer

Commissioner of Patents and Trademarks—Designate